US010889116B2

(12) United States Patent
Aotani et al.

(10) Patent No.: US 10,889,116 B2
(45) Date of Patent: Jan. 12, 2021

(54) IMAGE PRINTING METHOD

(71) Applicant: CANON KABUSHIKI KAISHA, Tokyo (JP)

(72) Inventors: Takaharu Aotani, Tokyo (JP); Masahiro Terada, Hadano (JP); Hidetaka Kawamura, Yokohama (JP); Akihiro Taya, Yokohama (JP); Yohei Masada, Tokyo (JP); Masanobu Ootsuka, Tokyo (JP); Shoji Koike, Yokohama (JP); Yutaka Yoshimasa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/039,180

(22) Filed: Jul. 18, 2018

(65) Prior Publication Data

US 2018/0319164 A1    Nov. 8, 2018

Related U.S. Application Data

(63) Continuation of application No. PCT/JP2017/001448, filed on Jan. 18, 2017.

(30) Foreign Application Priority Data

Jan. 22, 2016  (JP) .................................. 2016-010901

(51) Int. Cl.
*B41J 2/155* (2006.01)
*C09D 11/322* (2014.01)
(Continued)

(52) U.S. Cl.
CPC ................. *B41J 2/155* (2013.01); *B41J 2/21* (2013.01); *B41J 2/2107* (2013.01); *B41J 2/2146* (2013.01);
(Continued)

(58) Field of Classification Search
CPC ...... B41J 2/0057; B41J 2/01; B41J 2002/012; B41J 2/211; B41J 2/1433; B41J 2/17;
(Continued)

(56) References Cited

U.S. PATENT DOCUMENTS

| 8,430,497 | B2 * | 4/2013 | Okada | ................... | B41J 2/2107 347/100 |
| 2012/0026240 | A1 * | 2/2012 | Saito | ................... | B41M 7/0018 347/21 |

(Continued)

FOREIGN PATENT DOCUMENTS

| JP | 2004-338392 A | 12/2004 |
| JP | 2008-284874 A | 11/2008 |

(Continued)

*Primary Examiner* — Manish S Shah
(74) *Attorney, Agent, or Firm* — Canon U.S.A., Inc. IP Division

(57) ABSTRACT

An image printing method includes the step of applying at least two inks that contain a color pigment, resin particles, and water onto a printing medium by ejecting the inks using an inkjet printing apparatus. The inkjet printing apparatus includes at least two printing heads sequentially arranged in a printing medium conveying direction, the printing medium is normal paper or a high-absorbency printing medium, a rub fastness additive is contained in a first ink ejected from at least a first printing head that is located at an uppermost-stream position in the printing medium conveying direction of the at least two printing heads, and the content of the rub fastness additive in an ink ejected from a printing head that is located at a position downstream of the first printing head in the printing medium conveying direction is less than the content of the rub fastness additive in the first ink.

13 Claims, 2 Drawing Sheets

(51) Int. Cl.
*C09D 11/38* (2014.01)
*B41M 5/00* (2006.01)
*B41J 2/21* (2006.01)
*C09D 11/12* (2006.01)
*B41M 5/52* (2006.01)
*C09D 11/08* (2006.01)

(52) U.S. Cl.
CPC ............ *B41M 5/0023* (2013.01); *B41M 5/52* (2013.01); *C09D 11/08* (2013.01); *C09D 11/12* (2013.01); *C09D 11/322* (2013.01); *C09D 11/38* (2013.01)

(58) Field of Classification Search
CPC .... B41J 2/17593; B41J 2/2107; B41J 2/1755; B41J 2/2114; B41J 2/2117; B41J 2/2056; B41J 2/21; B41J 3/60; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/30; C09D 11/00; C09D 11/36; C09D 11/40; C09D 11/38; C09D 11/32; C09D 11/322; C09D 11/324; C09D 11/328; C09D 11/101; C09D 11/102; C09D 11/005; C09D 11/54; C09D 11/52; B41M 5/025; B41M 5/03; B41M 5/0017; B41M 5/0011; B41M 5/0047; B41M 7/00; B41M 7/0072; B41M 5/52; B41M 5/5218; B41N 10/00

See application file for complete search history.

(56) References Cited

U.S. PATENT DOCUMENTS

| | | | |
|---|---|---|---|
| 2014/0125750 A1* | 5/2014 | Sasaki | B41J 11/002 347/104 |
| 2014/0132684 A1* | 5/2014 | Ohta | B41J 11/0015 347/102 |
| 2014/0192111 A1* | 7/2014 | Nagai | B41J 2/2107 347/20 |
| 2016/0046816 A1* | 2/2016 | Takahashi | C09D 11/326 347/102 |
| 2017/0137651 A1* | 5/2017 | Watanabe | C09D 11/02 |
| 2017/0166764 A1* | 6/2017 | Katsuragi | B41J 2/14016 |
| 2017/0210919 A1* | 7/2017 | Yoshimasa | B41J 2/01 |
| 2017/0313896 A1* | 11/2017 | Katsuragi | C09D 11/108 |
| 2018/0030300 A1* | 2/2018 | Ohta | B41J 2/01 |

FOREIGN PATENT DOCUMENTS

| | | |
|---|---|---|
| JP | 2013-060565 A | 4/2013 |
| JP | 2013-129711 A | 7/2013 |
| JP | 2013-180428 A | 9/2013 |
| JP | 2013-193324 A | 9/2013 |
| JP | 5347430 B2 | 11/2013 |
| JP | 2015-205999 A | 11/2015 |

* cited by examiner

IMAGE PRINTING METHOD

CROSS-REFERENCE TO RELATED APPLICATIONS

This application is a Continuation of International Patent Application No. PCT/JP2017/001448, filed Jan. 18, 2017, which claims the benefit of Japanese Patent Application No. 2016-010901, filed Jan. 22, 2016, both of which are hereby incorporated by reference herein in their entirety.

TECHNICAL FIELD

The present invention relates to an image printing method.

BACKGROUND ART

An inkjet printing method can easily print a high-quality color image despite being based on a simple principle and, therefore, is one of a plurality of image printing methods that have been considerably developed in recent years. The inkjet printing method is rapidly becoming widespread not only for printing images of documents, photographs, and the like in the home, which has been the mainstream use, but also for office and industrial use.

Regarding the inkjet printing method in the related art, an ink containing a specific self-dispersible pigment or resin-dispersed pigment that serves as a coloring material is used for the purpose of increasing the optical density of a printed image. However, an ink containing the self-dispersible pigment has a problem in that rub fastness of an image is poor while the optical density of an image is relatively high. Consequently, a pigment ink containing a wax serving as a component that improves the rub fastness of a printed image (rub fastness additive) has been proposed (PTL 1).

CITATION LIST

Patent Literature

PTL 1 Japanese Patent No. 5347430

According to investigations by the present inventors, it was found that an image having good rub fastness could be printed by using the pigment ink proposed in PTL 1. However, it was found that if pigment inks of a plurality of colors proposed in PTL 1 were used in combination, color developability of a printed image was degraded.

Accordingly, it is an object of the present invention to provide an image printing method capable of printing an image having excellent color developability and excellent rub fastness even when color inks of a plurality of colors are used.

SUMMARY OF INVENTION

The above-described object is realized by the present invention described below. According to the present invention, an image printing method is provided. The image printing method includes the step of applying at least two inks that contain a color pigment, resin particles, and water onto a printing medium by ejecting the inks using an inkjet printing apparatus, wherein the inkjet printing apparatus includes at least two printing heads sequentially arranged in a printing medium conveying direction, the printing medium is normal paper or a high-absorbency printing medium, a rub fastness additive is contained in a first ink ejected from at least a first printing head that is located at an uppermost-stream position in the printing medium conveying direction of the at least two printing heads, and the content of the rub fastness additive in an ink ejected from a printing head that is located at a position downstream of the first printing head in the printing medium conveying direction is less than the content of the rub fastness additive in the first ink.

Further features of the present invention will become apparent from the following description of exemplary embodiments with reference to the attached drawings.

DESCRIPTION OF EMBODIMENTS

The embodiments according to the present invention will be described below. However, the present invention is not limited to the following embodiments. Various physical property values in the present specification are values at ambient temperature (25° C.) unless otherwise specified. The present inventors performed various investigations on a method for printing an image having color developability and rub fastness in combination on normal paper and on a high-absorbency printing medium by using color inks of a plurality of colors containing a pigment serving as a coloring material. As a result, it was found that use of an ink in which the content of a component for improving the rub fastness of an image (rub fastness additive) was changed in consideration of the order of ejection was important, and the present invention was realized.

Figure 1:
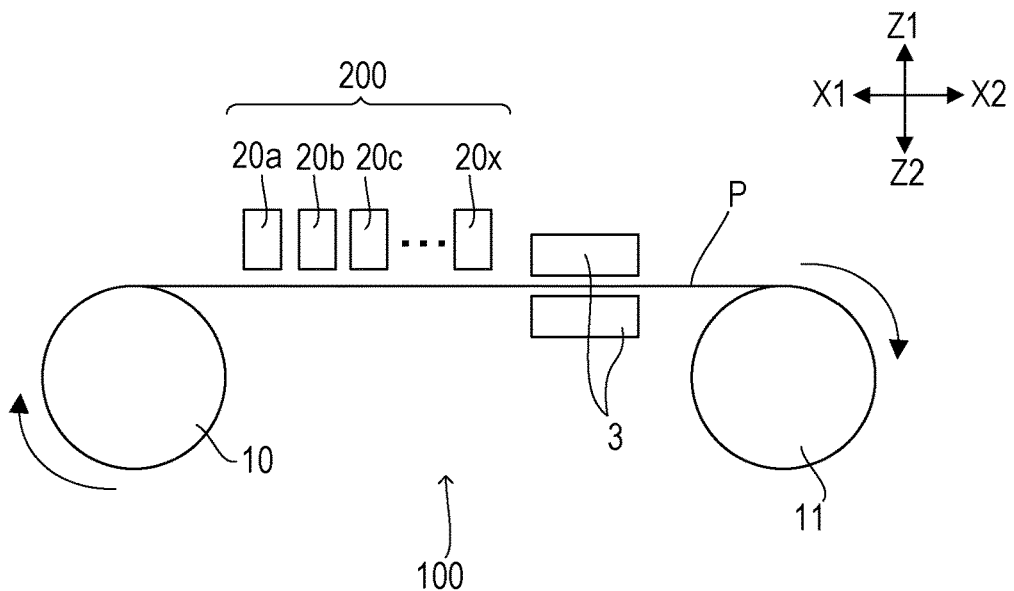
FIG. 1 is a schematic diagram showing an example of an inkjet printing apparatus used for an image printing method according to the present invention.

The configuration and operation of an inkjet printing apparatus used for the image printing method according to the present invention will be described with reference to FIG. 1. FIG. 1 is a schematic diagram showing an example of the inkjet printing apparatus used for an image printing method according to the present invention. As shown in FIG. 1, an inkjet printing apparatus 100, e.g., a printer, ejects an ink onto a printing medium P, e.g., normal paper or a high-absorbency printing medium, on the basis of, for example, image data and printing information (presence or absence of duplex printing and the like), which were received from an external computer or the like so as to print an image. Specifically, the ink ejected from an ink-applying configuration 200 is applied to one surface (printing surface) of the printing medium P fed from a printing medium supply configuration 10, and an image is printed.

The ink-applying configuration 200 is composed of line heads 20a, 20b, 20c, . . . , 20x that eject at least two inks having different hues. The printing medium P provided with the image is wound by a printing medium recovery configuration 11 and, therefore, the image printed on one surface of the printing medium P comes into contact with the other surface (non-printing surface) of the printing medium P. If the rub fastness of the printed image is poor, the ink is attached to the non-printing surface of the printing medium P when the image is rubbed due to contact with the non-printing surface, and the possibility of degradation of the image quality increases.

Figure 2:
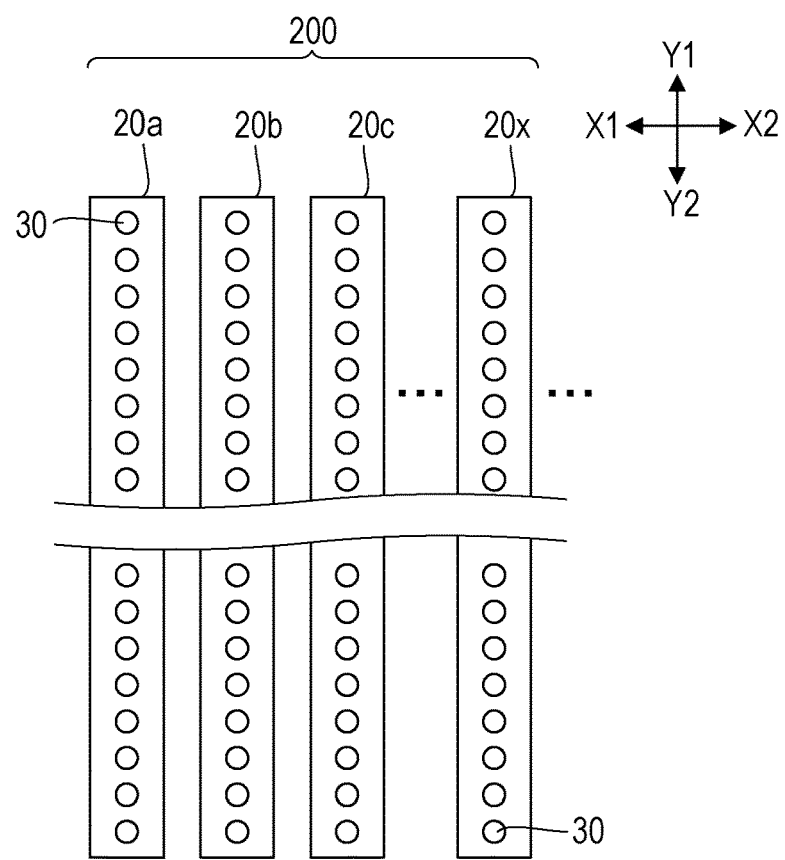
FIG. 2 is a schematic diagram showing an example of a line head constituting an ink-applying configuration.

FIG. 2 is a schematic diagram showing an example of line heads constituting the ink-applying configuration. The plurality of line heads 20a, 20b, 20c, . . . , 20x are elongated arrays of inkjet printing heads, each of which extends in a direction (Y-direction) orthogonal to the printing medium conveying direction and which are sequentially arranged in the printing medium conveying direction (X-direction). Preferably, the length (length in Y-direction) of each of the line heads 20a, 20b, 20c, . . . , 20x is larger than the width of the printing medium so that the image can be printed in the width direction by one operation. Meanwhile, each of the plurality of line heads 20a, 20b, 20c, . . . , 20x includes a plurality of ejection units 30 arranged in the Y-direction. The plurality of line heads 20a, 20b, 20c, . . . , 20x eject inks from the respective ejection units 30 in accordance with received image data and the like.

Regarding the inkjet printing apparatus 100 shown in FIG. 1, the plurality of line heads 20a, 20b, 20c, . . . , 20x eject inks sequentially on a line head basis so as to apply the inks to the printing medium P and print an image. That is, the line heads 20a, 20b, 20c, . . . , 20x are arranged sequentially from the upstream side (X1 side) of the printing medium P conveying direction toward the downstream side (X2 side) and eject inks in this order. Consequently, inks are applied to the same position of the printing medium P and an image can be printed.

As a result of investigations, it was found that, when an image was printed by sequentially ejecting inks of a plurality of colors onto normal paper or a high-absorbency printing medium, the printing surface of the printing medium was most influenced by the color of the ink applied first (first ink) (also referred to as a color-order effect). The first ink applied to the printing surface of the printing medium fills the gaps in cellulose constituting the printing medium and gaps between particles in the printing medium. It is conjectured that when an ink (second ink) other than the first ink is applied to the printing surface thereafter, that the second ink enters a lower layer portion of the printing medium via large gaps not filled by the first ink. Therefore, it is considered that the surface of the printing medium after water is evaporated is most influenced by the color of the first ink. In addition, the time interval between the first ink and the second ink further decreases as the printing is performed at a higher speed, and it is considered that a large amount of first ink remains in gaps when the second ink is applied, and the color-order effect is further strongly exerted.

In this regard, when an ink containing a rub fastness additive is used, the rub fastness additive is fixed to the surface of the printing medium and, thereby, peeling of an image due to rubbing can be suppressed. It is conjectured that fixing occurs in the order of "a rub fastness additive in the first ink, a color pigment in the first ink, a rub fastness additive in the second ink, and a color pigment in the second ink" from the upper layer toward the lower layer. In particular, a case where high-speed printing is performed by using an inkjet printing apparatus including line type heads that eject color inks of a plurality of colors (line heads) is assumed. In this case, it is conjectured that the rub fastness additive in an ink that is applied after the first ink does not contribute to improvement of the rub fastness of the image but, in contrast, is associated with degradation of the color developability of the image.

In the image printing method according to the present invention, an inkjet printing apparatus including at least two printing heads sequentially arranged in a printing medium conveying direction is used, at least two inks that contain a color pigment, resin particles, and water are ejected and applied to a printing medium. Normal paper or a high-absorbency printing medium is used as the printing medium. A rub fastness additive is contained in a first ink ejected from at least a first printing head that is located at an uppermost-stream position in the printing medium conveying direction of the at least two printing heads. The content of the rub fastness additive in an ink ejected from a printing head that is located at a position downstream of the first printing head in the printing medium conveying direction is less than the content of the rub fastness additive in the first ink. The image printing method according to the present invention can print an image having excellent color developability and excellent rub fastness by satisfying the above-described requirements even when color inks of a plurality of colors are used.

Ink

The image printing method according to the present invention includes the step of applying at least two inks that contain a color pigment, resin particles, and water to a printing medium by ejecting the inks using an inkjet printing apparatus. The components constituting the ink used in the image printing method according to the present invention, the physical properties of the ink, and the like will be described below in detail.

Color Pigment

Regarding the color pigment (hereafter also referred to simply as "pigment"), any pigment, e.g., a resin-dispersed pigment or a self-dispersible pigment, that is dispersible in water can be used. Examples of the type of pigment include an inorganic pigment and an organic pigment, and any known pigment usable for an ink can be adopted.

Regarding the organic pigment, a cyan pigment, a magenta pigment, a yellow pigment, and the like can be used. Preferably, a copper phthalocyanine pigment is used as the cyan pigment. Specific examples of the copper phthalocyanine pigment include C.I. Pigment Blue 1, 2, 3, 15, 15:2, 15:3, 15:4, 16, 22, and 60. Preferably, a quinacridone pigment is used as the magenta pigment. Specific examples of the quinacridone pigment include C.I. Pigment Red 5, 7, 12, 48, 48:1, 57, 112, 122, 123, 146, 168, 184, 202, and 207. Preferably, an azo pigment is used as the yellow pigment. Specific examples of the azo pigment include C.I. Pigment Yellow 12, 13, 14, 16, 17, 74, 83, 93, 95, 97, 98, 114, 128, 129, 151, and 154.

Regarding the color pigment, the self-dispersible pigment, in which hydrophilic groups bond to the surfaces of pigment particles, or the resin-dispersed pigment dispersed by a resin dispersant can be used. The resin-dispersed pigment may be any one of a resin-dispersed pigment in which a resin dispersant is used, a microcapsule pigment in which surfaces of pigment particles are covered with a resin, and a resin-bonding pigment in which organic groups, each including a resin, chemically bond to the surfaces of pigment particles. In this regard, pigments prepared by different dispersing methods may be used in combination, or at least two types of pigments may be used in combination.

The content of the pigment in the ink is preferably 0.1% by mass or more and 10.0% by mass or less, and further preferably 1.0% by mass or more and 8.0% by mass or less relative to a total mass of the ink. If the content of the pigment is less than 0.1% by mass, the optical density of a printed image may become insufficient. On the other hand, if the content of the pigment is more than 10.0% by mass, the ejection stability and the like may become insufficient.

Self-Dispersible Pigment

In the present invention, "self-dispersible pigment" refers to a pigment in which at least one type of hydrophilic group bonds to the surfaces of pigment particles directly or with another atomic group (—R—) interposed therebetween. Examples of the hydrophilic group include —COOM, —SO$_3$M, —PO$_3$HM, and —PO$_3$M$_2$. In the above-described formulae, "M" preferably represents a hydrogen atom an alkali metal, ammonium, or organic ammonium. Further preferably, "M" in the above-described formulae represents an alkali metal, e.g., lithium, sodium, or potassium, because the ejection stability of the ink becomes favorable. Meanwhile, a substituent that bonds to the surfaces of pigment particles and that contains a hydrophilic group and another atomic group (—R—) is preferably a group having a structure denoted by —CQ(PO$_3$M$_2$)$_2$. In the above-described formula, "Q" represents R', OR', SR', or NR'$_2$. In this regard, each R' represents a hydrogen atom, an alkyl group, an acyl group, an aralkyl group, or an aryl group. Examples of the alkyl group include a methyl group and an ethyl group. Examples of the acyl group include an acetyl group and a benzoyl group. Examples of the aralkyl group include a benzyl group. Examples of the aryl group include a phenyl group and a naphthyl group. The substituent that bonds to the surface of a pigment particle and that contains a hydrophilic group and another atomic group (—R—) is particularly preferably a group having a structure denoted by —CH(PO$_3$M$_2$)$_2$.

Examples of the other atomic group (—R—) include an amide group, an amino group, a ketone group, an ester group, an ether group, an alkylene group having a carbon number of 1 to 12, a phenylene group, a substituted phenylene group, a naphthylene group, and a substituted naphthylene group. In particular, the other atomic group (—R—) is preferably a group having —C$_6$H$_4$—CONH— (benzamide structure) or —C$_6$H$_4$—SO$_2$NH— (benzene sulfonamide structure). In this regard, a plurality of phosphonic acid groups may bond to a carbon atom of the other atomic group (—R—). Specifically, it is preferable that a self-dispersible pigment be used, in which atomic groups bond to surfaces of pigment particles, a bisphosphonic acid group or a triphosphonic acid group bonding to the atomic group. Regarding the form of the hydrophilic groups in the ink, some hydrophilic groups may be in a dissociated state or hydrophilic groups may be in an entirely dissociated state.

From the viewpoint of color developability of a printed image, it is preferable that a phosphonic-acid-based self-dispersible pigment in which phosphonic acid groups bond to pigment particle surfaces directly or with other atomic groups interposed therebetween be used as the self-dispersible pigment. A plurality of phosphonic acid groups may bond to a carbon atom of the other atomic group (—R—). Specifically, it is preferable that a phosphonic-acid-based self-dispersible pigment in which atomic groups bond to surfaces of pigment particles with a bisphosphonic acid group or a triphosphonic acid group bonding to the atomic group be used. In particular, it is preferable that a phosphonic-acid-based self-dispersible pigment in which atomic groups bond to surfaces of pigment particles with a bisphosphonic acid group bonding to the atomic group be used to improve the color developability of a printed image.

Method for Analyzing Pigment

An analytical method for examining whether or not a pigment in an ink is a self-dispersible pigment may be the method described below. Initially, the ink is subjected to acidifying and, thereafter, centrifugal separation is performed so as to take precipitates. In this regard, when a sample is a pigment dispersion material, the pigment dispersion material is subjected to acidifying and, thereafter, precipitates are taken. Subsequently, the resulting precipitates are taken on a laboratory dish, water is added, and agitation is performed so as to disperse again. After standing for a day, when no precipitate is generated on a laboratory dish and the pigment is dispersed, it is possible to determine that the pigment is a self-dispersible pigment.

Whether or not the self-dispersible pigment in the ink has phosphonic acid groups can be determined by performing ICP emission spectroscopy. Specifically, ICP emission spectroscopy is performed, and when a phosphorus element is identified, it is possible to determine that the self-dispersible pigment has phosphonic acid groups.

Resin-Dispersed Pigment

Regarding the resin dispersant contained in the resin-dispersed pigment, a resin dispersant that has been previously used for an inkjet ink can be adopted. The weight average molecular weight, measured by gel permeation chromatography (GPC), of the resin dispersant in terms of polystyrene is preferably 1,000 or more and 30,000 or less, and further preferably 3,000 or more and 15,000 or less. The acid value of the resin dispersant is preferably 50 mgKOH/g or more and 350 mgKOH/g or less, and further preferably 80 mgKOH/g or more and 250 mgKOH/g or less. When a resin dispersant having an acid value within the above-described range is used, the dispersion stability of the pigment and the ejection stability of the ink are improved. The acid value of the resin dispersant may be measured by potentiometric titration.

The content (% by mass) of the resin dispersant in the ink is preferably 0.1% by mass or more and 5.0% by mass or less, and further preferably 0.5% by mass or more and 3.0% by mass or less relative to a total mass of the ink. The content (% by mass) of the pigment in the ink is preferably more than 3 times the content (1 by mass) of the resin dispersant in a molar ratio, more preferably 3.3 times or more, and further preferably 4 times or more and 10 times or less.

The content (% by mass) of the pigment in the ink is preferably 0.3 times or more and 5.0 times or less the content (% by mass) of the resin, e.g., resin particles, in a molar ratio, and further preferably 0.5 times or more and 2.0 times or less.

The resin dispersant is preferably water-soluble. In the present invention, "a resin is water-soluble" refers to a state in which, when a resin is neutralized by an alkali equivalent to the acid value, the resin ceases to have a particle diameter in an aqueous medium. Examples of monomers used in preparing the resin dispersant include styrene, vinyl naphthalene, an aliphatic alcohol ester of α, β-ethylenic unsaturated carboxylic acid, acrylic acid, methacrylic acid, maleic acid, itaconic acid, fumaric acid, vinyl acetate, vinyl pyrrolidone, acrylic amide, and derivatives thereof. These monomers may be used alone, or at least two types may be used in combination. Preferably, at least one of the monomers is a hydrophilic monomer. Regarding the hydrophilic monomer, it is preferable that at least one of acrylic acid and methacrylic acid be used as the hydrophilic monomer. It is particularly preferable that a copolymer having a unit derived from acrylic acid and a unit derived from methacrylic acid be used as the resin dispersant. Block copolymers, random copolymers, graft copolymers, salts thereof, and the like may also be used. Further, natural resins, e.g., rosin, shellac, and starch, may also be used as the resin dispersant.

Method for Determining Whether or not Pigment is Dispersed by Resin Dispersant

Initially, a liquid is prepared by concentrating or diluting an ink such that the content of total solids is adjusted to be about 10% by mass. Subsequently, the resulting liquid is subjected to centrifugal separation at 12,000 rpm for 1 hour, and precipitated components containing the pigment are recovered. In this regard, a liquid phase contains a water-soluble organic solvent and components, e.g., a resin, that do not contribute to dispersion. Then, when a resin is included in the precipitated components recovered, it is possible to determine that the pigment was dispersed by the resin (resin dispersant). The resin included as a primary component in the precipitated components is the resin dispersant that contributes to dispersion of the pigment, and the resin included as a primary component in the liquid layer is a resin that is other than the resin dispersant and that does not contribute to dispersion of the pigment.

Resin Particles

The ink used in the image printing method according to the present invention includes resin particles. The rub fastness of the printed image can be improved by the resin particles included. In the present invention, "resin particles" refers to "particles composed of a resin that can be present in a state of being dispersed in an aqueous medium". The resin particles are preferably polyurethane resin particles or acrylic resin particles.

The 50% cumulative volume average particle diameter ($D_{50}$) of the resin particles is preferably 1 nm or more and 200 nm or less, and further preferably 100 nm or more and 200 nm or less. The weight average molecular weight of the resin particles may be measured by gel permeation chromatography (GPC) where polystyrene standard samples are used. The apparatus and the like used for GPC are as described below, for example. In this regard, "PS-1" and "PS-2" (trade names) (produced by Polymer Laboratories) may be used as the polystyrene standard samples.

Apparatus: Alliance GPC 2695 (produced by Waters)
Column: four-gang column of Shodex KF-806M (produced by SHOWA DENKO K.K.)
Detector: RI (refractive index)

Polyurethane Resin Particles

Physical Property of Polyurethane Resin Particles

The weight average molecular weight, measured by GPC, of the polyurethane resin particles in terms of polystyrene is preferably 5,000 or more and 150,000 or less, and further preferably 8,000 or more and 100,000 or less. If the weight average molecular weight of the polyurethane resin particles is less than 5,000, the strength of the polyurethane resin particles is reduced, and the rub fastness of the image may become insufficient. On the other hand, if the weight average molecular weight of the polyurethane resin particles is more than 150,000, the storage stability and the ejection stability of the ink may become insufficient.

The acid value of the polyurethane resin particles is preferably 100 mgKOH/g or less, and further preferably 5 mgKOH/g or more and 30 mgKOH/g or less. The glass transition temperature (Tg) of the polyurethane resin particles is preferably −80° C. or higher, and further preferably −50° C. or higher. The glass transition temperature (Tg) of the polyurethane resin particles is preferably 120° C. or lower, and further preferably 100° C. or lower.

Content of Polyurethane Resin Particles

The content of the polyurethane resin particles in the ink is preferably 0.1% by mass or more and 10.0% by mass or less relative to a total mass of the ink. If the content of the polyurethane resin particles is less than 0.1% by mass, an effect of improving the rub fastness of the image may become insufficient. On the other hand, if the content of the polyurethane resin particles is more than 10.0% by mass, the ejection stability of the ink may become insufficient. The content (% by mass) of the polyurethane resin particles in the ink is preferably 0.5 times or more and 4.0 times or less the content (% by mass) of the fluorine-based surfactant, described below, in a molar ratio, and further preferably 1.0 times or more and 3.0 times or less. If the above-described molar ratio is less than 0.5 times, an effect of improving the rub fastness of the image may become insufficient because the content of the polyurethane resin particles is relatively small. On the other hand, if the above-described molar ratio is more than 4.0 times, an effect of retaining resin particles in the vicinity of the surface of the printing medium may become insufficient because the content of the fluorine-based surfactant is relatively small. Consequently, effects of improving the color developability and the rub fastness may become insufficient.

Method for Producing Polyurethane Resin Particles

Polyurethane resin particles may be produced by a common method that has been used previously. For example, a polyurethane resin may be produced by the following method. Initially, a polyol having no acid group and an organic solvent, e.g., methyl ethyl ketone, are mixed and agitation is sufficiently performed so as to dissolve the polyol. Thereafter, a polyisocyanate and a diol having an acid group are added and a reaction is performed so as to produce an urethane prepolymer solution. Subsequently, the resulting urethane prepolymer solution is neutralized, ion-exchanged water is added, and high-speed agitation is performed by a homomixer so as to cause emulsification. After the emulsification, polyurethane resin particles are produced by adding a chain extender and performing a chain extension reaction. Materials for forming polyurethane resin particles will be described below.

(1) Polyisocyanate

A polyurethane resin constituting polyurethane resin particles usually contains a unit derived from a polyisocyanate. In the present invention, a "polyisocyanate" refers to a compound having at least two isocyanate groups. Examples of the polyisocyanate include an aliphatic polyisocyanate, an alicyclic polyisocyanate, an aromatic polyisocyanate, and an araliphatic polyisocyanate. The proportion of the unit derived from the polyisocyanate in the polyurethane resin is preferably 10.0% by mass or more and 80.0% by mass or less relative to the entire resin.

Specific examples of the aliphatic polyisocyanate include tetra methylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Specific examples of the alicyclic polyisocyanate include isophorone diisocyanate, hydrogenated xylylene diisocyanate, dicyclohexylmethane-4,4'-diisocyanate, 1,4-cyclohexane diisocyanate, methylcyclohexylene diisocyanate, and 1,3-bis(isocyanatomethyl)cyclohexane. Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Specific examples of the araliphatic polyisocyanate include dialkyldiphenylmethane diisocyanate, tetraalkyldiphenylmethane diisocyanate, and α, α, α, α-tetramethylxylylene diisocyanate. These polyisocyanates may be used alone, or at least two types may be used in combination. Among the above-described polyisocyanates, isophorone diisocyanate, hexamethylene diisocyanate, and dicyclohexylmethane-4,4'-diisocyanate are preferable.

(2) Polyol Having No Acid Group

The polyurethane resin constituting polyurethane resin particles preferably contains a unit derived from a polyol having no acid group. The proportion of the unit derived from a polyol having no acid group in the polyurethane resin is preferably 0.1% by mass or more and 80.0% by mass or less relative to the entire polyurethane resin.

Examples of the polyol having no acid group include a polyester polyol, a polyether polyol, and polycarbonate diol. The carbon number of the polyol having no acid group is preferably 13 or more and 250 or less. The number average molecular weight, which is measured by GPC, of polyol having no acid group is preferably 600 or more and 4,000 or less in the form of polystyrene.

Examples of the polyester polyol include an ester of an acid component and a polyalkylene glycol, dihydric alcohol, or a polyhydric alcohol of trihydric or higher. Examples of the acid component include an aromatic dicarboxylic acid, an alicyclic dicarboxylic acid, and an aliphatic dicarboxylic acid. Examples of the aromatic dicarboxylic acid include isophthalic aid, terephthalic acid, orthophthalic acid, 1,4-naphthalene dicarboxylic acid, 2,5-naphthalene dicarboxylic acid, 2,6-naphthalene dicarboxylic acid, biphenyl dicarboxylic acid, and tetrahydrophthalic acid. Examples of the alicyclic dicarboxylic acid include hydrogenated products of the above-described aromatic dicarboxylic acid. Examples of the aliphatic dicarboxylic acid include malonic acid, succinic acid, tartaric acid, oxalic acid, glutaric acid, adipic acid, pimelic acid, suberic acid, azelaic acid, sebasic acid, alkyl tartaric acid, linoleic acid, maleic acid, fumaric acid, mesaconic acid, citraconic acid, and itaconic acid. Also, reactive derivatives, e.g., acid anhydrides, alkyl esters, and acid halides, of these acids may be used as acid components constituting the polyester polyols. These acid components may be used alone, or at least two types may be used in combination.

Examples of the polyalkylene glycol include polyethylene glycol, polypropylene glycol, polytetramethylene glycol, and ethylene glycol-propylene glycol copolymers. Examples of the dihydric alcohol include hexamethylene glycol, tetramethylene glycol, ethylene glycol, diethylene glycol, propylene glycol, dipropylene glycol, 1,3-butane diol, 1,4-butane diol, 4,4'-dihydroxyphenyl propane, and 4,4'-dihydroxyphenyl methane. Examples of the polyhydric alcohol of trihydric or higher include glycerin, trimethylol propane, 1,2,5-hexane triol, 1,2,6-hexane triol, and pentaerythritol. These polyester polyols may be used alone, or at least two types may be used in combination.

Examples of the polyether polyol include a polyalkylene glycol and an addition polymerization product of an alkylene oxide and a dihydric alcohol or polyhydric alcohol of trihydric or higher. Examples of the polyalkylene glycol include polyethylene glycol, polypropylene glycol, polytetramethylene glycol, and ethylene glycol-propylene glycol copolymers. Examples of the dihydric alcohol include hexamethylene glycol, tetramethylene glycol, ethylene glycol, diethylene glycol, propylene glycol, dipropylene glycol, 1,3-butane diol, 1,4-butane diol, 4,4'-dihydroxyphenyl propane, and 4,4'-dihydroxyphenyl methane. Examples of the polyhydric alcohol of trihydric or higher include glycerin, trimethylol propane, 1,2,5-hexane triol, 1,2,6-hexane triol, and pentaerythritol. Examples of the alkylene oxide include ethylene oxide, propylene oxide, butylene oxide, and α-olefin oxide. These polyether polyols may be used alone, or at least two types may be used in combination.

A polycarbonate diol produced by a method that has been known previously may be used as the polycarbonate diol. For example, a polycarbonate diol produced by reacting a carbonate component, e.g., alkylene carbonate, diaryl carbonate, or dialkyl carbonate, or phosgene with an aliphatic diol component may be used. These polycarbonate diols may be used alone, or at least two types may be used in combination.

Among the above-described polyols having no acid group, it is preferable that a polyether polyol be used. When polyurethane resin particles produced by using the polyether polyol is used, the resulting resin film has appropriate flexibility and, thereby, the rub fastness of an image can be further improved. In addition, the polyether polyol has relatively high hydrophilicity and, therefore, the ejection stability of the ink can be improved. Among the polyether polyols, propylene glycol is particularly preferable.

(3) Diol Having Acid Group

A polyurethane resin constituting polyurethane resin particles preferably contains a unit derived from a diol having an acid group. In the present invention, a "diol having an acid group" refers to a diol having an acid group, e.g., a carboxyl group, a sulfonic acid group, or a phosphoric acid group. The diol having an acid group may be in the form of a metal salt of Li, Na, K, or the like or an organic amine salt of ammonia, dimethylamine, or the like. It is preferable that dimethylolpropionic acid or dimethylolbutanoic acid be used as the diol having an acid group. These diols having an acid group may be used alone, or at least two types may be used in combination. The proportion of the unit derived from a diol having an acid group in the polyurethane resin is preferably 5.0% by mass or more and 40.0% by mass or less relative to the entire polyurethane resin.

(4) Chain Extender

A chain extender may be used in production of polyurethane resin particles. The chain extender is a compound capable of reacting with isocyanate groups that remain without forming an urethane bond among polyisocyanate units in the urethane prepolymer. Specific examples of the chain extender include trimethylolomelamine and derivatives thereof, dimethylolurea and derivatives thereof, dimethylolethylamine, diethanolmethylamine, dipropanolethylamine, dibutanolmethylamine, ethylene diamine, propylene diamine, diethylene triamine, hexylene diamine, triethylene tetramine, tetraethylene pentamine, isophorone diamine, xylylene diamine, diphenylmethane diamine, hydrogenated diphenylmethane diamine, polyvalent amine compounds, e.g., hydrazine; polyamide polyamine; and polyethylene polyamine.

Specific examples of the chain extender further include ethylene glycol, propylene glycol, 1,3-propane diol, 1,3-butane diol, 1,4-butane diol, 1,5-pentane diol, 1,6-hexane diol, neopentyl glycol, diethylene glycol, triethylene glycol, tetraethylene glycol, dipropylene glycol, tripropylene glycol, polyethylene glycol, 3-methyl-1,5-pentane diol, 2-butyl-2-ethyl-1,3-propane diol, 1,4-cyclohexane diol, 1,4-cyclohexane dimethanol, hydrogenated bisphenol A, glycerin, trimethylolpropane, and pentaerythritol. These chain extenders may be used alone, or at least two types may be used in combination.

Acrylic Resin Particles

Physical Property of Acrylic Resin Particles

The weight average molecular weight, measured by GPC, of the acrylic resin particles in terms of polystyrene is preferably 100,000 or more and 3,000,000 or less, and further preferably 300,000 or more and 1,000,000 or less. If the weight average molecular weight of the acrylic resin particles is less than 100,000, the strength of the acrylic resin particles is reduced, and the rub fastness of the image may become insufficient. On the other hand, if the weight average molecular weight of the acrylic resin particles is more than 3,000,000, the storage stability and the ejection stability of the ink may become insufficient.

The acid value of the acrylic resin particles is preferably 150 mgKOH/g or less, and further preferably 25 mgKOH/g or more and 140 mgKOH/g or less. The glass transition temperature (Tg) of the acrylic resin particles is preferably −20° C. or higher, further preferably −10° C. or higher, and particularly preferably 25° C. or higher. The glass transition temperature (Tg) of the acrylic resin particles is preferably 120° C. or lower, and further preferably 100° C. or lower.

Content of Acrylic Resin Particles

The content of the acrylic resin particles in the ink is preferably 0.1% by mass or more and 10.0% by mass or less relative to a total mass of the ink. If the content of the acrylic resin particles is less than 0.1% by mass, an effect of improving the rub fastness of the image may become insufficient. On the other hand, if the content of the acrylic resin particles is more than 10.0% by mass, the ejection stability of the ink may become insufficient. The content (% by mass) of the acrylic resin particles in the ink is preferably 0.5 times or more and 4.0 times or less the content (% by mass) of the fluorine-based surfactant, described below, in a molar ratio, and further preferably 1.0 times or more and 3.0 times or less. If the above-described molar ratio is less than 0.5 times, an effect of improving the rub fastness of the image may become insufficient because the content of the acrylic resin particles is relatively small. On the other hand, if the above-described molar ratio is more than 4.0 times, an effect of retaining resin particles in the vicinity of the surface of the printing medium may become insufficient because the content of the fluorine-based surfactant is relatively small. Consequently, effects of improving the color developability and the rub fastness may become insufficient.

Monomer Used for Acrylic Resin Particles

A monomer used to produce the acrylic resin constituting acrylic resin particles may be a (meth)acrylic monomer. Specific examples of the (meth)acrylic monomer include (meth)acrylic acid alkyl esters, e.g., methyl (meth)acrylate, ethyl (meth)acrylate, propyl (meth)acrylate, butyl (meth) acrylate, hexyl (meth)acrylate, octyl (meth)acrylate, lauryl (meth)acrylate, and stearyl (meth)acrylate; and (meth) acrylic acids, e.g., acrylic acid and methacrylic acid. The acrylic acid may be a monopolymer of a (meth)acrylic monomer or a copolymer of a (meth)acrylic monomer and other monomers. Examples of the other monomers include vinyl esters, olefins, styrene and the like, crotonic acid and the like, itaconic acid and the like, maleic acid and the like, fumaric acid and the like, acrylamides, allyl compounds, vinyl ethers, vinyl ketones, glycidyl esters, and unsaturated nitriles. When the acrylic resin is a copolymer, the proportion of units derived from the (meth)acrylic monomer in the copolymer is preferably 50% by mole or more relative to the entire copolymer.

Rub Fastness Additive

At least two inks are used in the image printing method according to the present invention, and a rub fastness additive is contained in at least a first ink ejected from a first printing head that is located at an uppermost-stream position in the printing medium conveying direction. The content of the rub fastness additive in an ink ejected from a printing head that is located at a position downstream of the first printing head in the printing medium conveying direction is less than the content of the rub fastness additive in the first ink. That is, the "other inks" (second ink, third ink, . . . ) other than the first ink may contain the rub fastness additive, but the contents of the rub fastness additive in the other inks have to be smaller than the content of the rub fastness additive in the first ink. In this regard, the other inks may contain substantially no rub fastness additive. Consequently, even when color inks of a plurality of colors are used, as described above, an image having excellent color developability and excellent rub fastness in combination can be printed by changing the content of the rub fastness additive in the ink in accordance with the order of application to the printing medium.

The content of the rub fastness additive in an ink ejected from a printing head that is located at a downstream-side position in the printing medium conveying direction is preferably at least 0.5% by mass less than, further preferably at least 0.6% by mass less than, and particularly preferably at least 0.7% by mass less than the content of the rub fastness additive in an ink ejected from an upstream-side adjoining printing head in the printing medium conveying direction. When the content of the rub fastness additive in the ink applied to the printing medium is sequentially reduced by at least 0.5% by mass from the upstream-side toward the downstream-side in the printing medium conveying direction, an image having more excellent color developability and more excellent rub fastness can be printed.

Wax

Wax or a predetermined surfactant may be used as the rub fastness additive. When the wax is used, frictional resistance of an ink film surface after drying can be reduced and, thereby, the image can be provided with rub fastness. Examples of the wax include plant-animal-based waxes, e.g., a carnauba wax, a candelilla wax, a beeswax, a rice wax, and lanoline; petroleum-based waxes, e.g., a paraffin wax, a microcrystalline wax, a polyethylene wax, a polyethylene oxide wax, and petrolatum; mineral-based waxes, e.g., a montan wax and ozokerite; synthetic waxes, e.g., a carbon wax, Hoechst wax, a polyolefin wax, and a stearic acid amide; and natural-synthetic wax emulsions, e.g., α-olefin-maleic anhydride copolymers, and compound waxes. These waxes may be used alone, or at least two types may be used in combination. In particular, a polyolefin wax is preferable, and a polyethylene wax and a polypropylene wax are further preferable.

A commercially available wax may be used without being processed. Specific examples of the commercially available wax include, on a trade name basis, Lube190 (produced by Michelman), NOPCOTE PEM-17 (produced by San Nopco Limited), CHEMIPEAPL W4005 (produced by Mitsui Chemicals, Inc.), and AQUACER515 (produced by BYK Japan KK). From the viewpoint of further improving the rub fastness of the printed image, the content of the wax in the first ink is preferably 0.5% by mass or more and 5.0% by mass or less, and further preferably 2.0% by mass or more and 5.0% by mass or less relative to a total mass of the first ink.

Fluorine-Based Surfactant and Silicon-Based Surfactant

Examples of the predetermined surfactant usable as the rub fastness additive include fluorine-based surfactants and silicon-based surfactants. These surfactants may be used alone, or at least two types may be used in combination. Specific examples of the commercially available fluorine-based surfactant include, on a trade name basis, FS63, FS64, and FS3100 (these are produced by DuPont); and MEGAFACE F-444 (produced by DIC Corporation). Specific examples of the commercially available silicon-based surfactant include BYK333 (produced by BYK Japan KK) on a trade name basis. From the viewpoint of further improving the rub fastness of the printed image, the content of the surfactant in the first ink is preferably 0.1% by mass or more and 1.0% by mass or less relative to a total mass of the first ink.

Other Surfactants

Preferably, the ink used in the image printing method according to the present invention further contains "other surfactants" other than the above-described specific surfactants. Regarding the other surfactants, any surfactant that has been known previously may be used. In particular, nonionic surfactants are preferable. Among the nonionic surfactants, ethylene oxide adducts of polyoxyethylene alkyl ethers, acetylene glycols, and the like are preferable. Further, the surfactant is preferably a surfactant denoted by general formula (1) described below. Specific examples of surfactants denoted by general formula (1) include, on a trade name basis, Acetylenol (produced by Kawaken Fine Chemicals Co., Ltd.); Surfynol (Air Products and Chemicals, Inc.); and Dynol 604, 607, 800, and 810 (these are produced by Air Products and Chemicals, Inc.).

General formula (1)

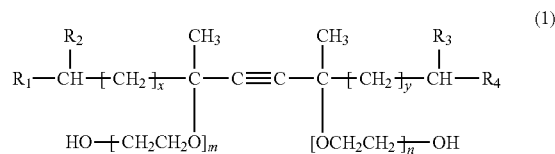

(in general formula (1) described above, each of $R_1$ to $R_4$ represents an alkyl group having a carbon number of 1 to 3, each of x and y represents a number of 1 to 5, and m+n represents a number of 0 to 10)

In general formula (1), each of $R_1$ to $R_4$ is preferably a methyl group. Each of x and y is preferably a number of 1 or 2. Each of m and n is preferably 0 to 7. m+n is preferably a number of 2 to 5. Further, it is preferable that x=y=2 applies.

The content (% by mass) of the other surfactants in the ink is preferably 0.5% by mass or more and 3.0% by mass or less, and further preferably 0.7% by mass or more and 1.5% by mass or less relative to a total mass of the ink. If the content of the other surfactants is less than 0.5% by mass, the color developability of the image may become insufficient from the viewpoint of dot formation. On the other hand, if the content of the other surfactants is more than 3.0% by mass, the color developability of the image may become insufficient. Meanwhile, the ink may contain, for example, acetylene glycol or a nonionic surfactant that is an ethylene oxide adduct of acetylene glycol.

Water

The ink used in the image printing method according to the present invention is an aqueous ink containing water. Preferably, deionized water (ion-exchanged water) is used as the water. The content of the water in the ink is preferably 50% by mass or more and 90% by mass or less relative to a total mass of the ink.

Water-Soluble Organic Solvent

Preferably, the ink used in the image printing method according to the present invention contains a water-soluble organic solvent. In the present invention, "water-soluble organic solvent" refers to "organic solvent having solubility into water at 120° C. of 500 g/L or more". Regarding the water-soluble organic solvent, any known water-soluble organic solvent usable for an ink can be used. Specific examples of the water-soluble organic solvent include alcohols, glycols, alkylene glycols, polyethylene glycols, nitrogen-containing compounds, and sulfur-containing compounds. These water-soluble organic solvents may be used alone, or at least two types may be used in combination. From the viewpoint of viscosity adjustment of the ink, it is preferable that a polyethylene glycol and glycerin be used. The number average molecular weight of the polyethylene glycol is preferably 500 or more and 1,200 or less, and preferably 1,000 (so-called "polyethylene glycol 1000"). When the polyethylene glycol and glycerin are used in combination, the content (% by mass) of the polyethylene glycol is preferably 0.15 times or more and 0.40 times or less the content (% by mass) of glycerin in a molar ratio. The content of the water-soluble organic solvent in the ink is preferably 50% by mass or less, and further preferably 5% by mass or more and 45% by mass or less relative to a total mass of the ink.

Additive

The ink used in the image printing method according to the present invention may contain various additives, e.g., a surfactant other than those described above, a pH adjuster, a rust inhibitor, a preservative, a fungicide, an antioxidant, a reducing inhibitor, an evaporation promotor, and a chelating agent, as the situation demands. Regarding the pH adjuster, preferably, an amine compound having a buffer capacity is used and, further preferably, N-butyldiethanolamine is used.

Image Printing Method

The image printing method according to the present invention includes the step of applying at least two inks described above onto a printing medium by ejecting the inks using an inkjet printing apparatus (ink application). In addition, it is preferable that the image printing method according to the present invention further include a conveying step to convey the printing medium and a heating step to heat the printing medium provided with the ink.

Regarding an inkjet printing apparatus 100 shown in FIG. 1, a form in which a printing medium P wound into the shape of a roll is used and the printing medium P printed with an image is wound again into the shape of a roll is shown. That is, the inkjet printing apparatus 100 shown in FIG. 1 includes a printing medium supply configuration 10, an ink-applying configuration 200, a heating configuration 3, and a printing medium recovery configuration 11. The printing medium supply configuration 10 is a unit that holds the printing medium P wound into the shape of a roll and supplies the printing medium P. The ink-applying configuration 200 is a unit that applies an ink to the printing medium P sent from the printing medium supply configuration 10. The heating configuration 3 is a unit that heats the printing medium P provided with the ink. The printing medium recovery configuration 11 is a unit that winds the printing medium P provided with the ink and, thereby, printed with an image. The printing medium P is conveyed by a conveying configuration including conveying members, e.g., a pair of rollers and a belt, along a conveying path indicated by a solid line in FIG. 1 and processed in each unit. In this regard, the printing medium P wound into the shape of a roll by the printing medium recovery configuration 11 may be supplied to other apparatuses and the like so as to be subjected to processing, e.g., cutting the printing medium P into a predetermined size or bookbinding.

The conveying rate of the printing medium P in the conveying step is preferably 50 m/min or more, and further preferably 100 m/min or more. From the viewpoint of drying property and the like, the amount of ink ejected per color is preferably 1.0 mg/cm$^2$ or less, and further preferably 0.8 mg/cm$^2$ or less.

It is preferable that an appropriate tension be applied to the printing medium P during conveying. That is, preferably, the inkjet printing apparatus 100 further includes a tension-applying configuration that applies a tension to the printing medium P. Specifically, a tension-applying portion that applies a tension to the printing medium P, a tension-adjusting portion that adjusts the tension applied to the printing medium P, and the like may be disposed on the conveying path between the printing medium supply configuration 10 and the printing medium recovery configuration 11. When a tension is applied to the printing medium, swelling of fibers constituting the printing medium due to water in the ink is suppressed. If fibers constituting the printing medium are swelled, gaps between the fibers increase so as to increase the ink permeation rate. However, if the ink permeation rate increases, the optical density of an image may become insufficient because the ink tends to deeply permeate in a direction orthogonal to the surface of the printing medium. On the other hand, when a tension is applied to the printing medium, swelling of the fibers constituting the printing medium is suppressed and, thereby, a decrease in the optical density of the image due to an increase in the ink permeation rate can be suppressed.

The tension applied to the printing medium is set to be preferably 20 N/m or more, further preferably 30 N/m or more, and particularly preferably 40 N/m or more and 100 N/m or less. When the tension applied to the printing medium is set to be 20 N/m or more, swelling of the fibers constituting the printing medium due to water in the ink is more efficiently suppressed.

Ink-Applying Step

An ink-applying step is a step of applying the ink to the printing medium. Regarding a system to apply the ink to the printing medium, an inkjet system is adopted. That the image printing method according to the present invention is an inkjet printing method. The inkjet system may be a thermal inkjet system or a piezoelectric inkjet system. The thermal inkjet system is a system to apply thermal energy to an ink and, thereby, to eject the ink from an ejection port of a printing head. The piezoelectric inkjet system is a system to eject the ink from an ejection port of a printing head by using a piezoelectric element. In the image printing method according to the present invention, an ink containing resin particles and having a relatively high solid concentration is used. Therefore, it is preferable that the ink is applied to the printing medium by the piezoelectric inkjet system from the viewpoint of ejection stability of the ink.

The printing head may be a serial type printing head or a full-line type printing head. The serial type printing head is a printing head that prints an image by scanning a printing head in a direction intersecting the printing medium conveying direction. The full line type printing head is a printing head in which a plurality of nozzles are arranged in a range covering a maximum width of the printing medium. Preferably, inkjet printing apparatuses including full-line type printing heads, as shown in FIGS. 1 and 2, are used because an image can be printed at a higher speed. In the full-line type inkjet printing apparatus, preferably, nozzle lines are arranged in a direction orthogonal to the printing medium conveying direction. Usually, a plurality of full-line type inkjet printing heads are disposed in accordance with ink colors, and it is preferable that printing heads be sequentially arranged in parallel to each other in the printing medium conveying direction.

Heating Step

The heating step is a step of performing heating such that the surface temperature of the printing medium provided with the ink becomes 70° C. or higher. In the present invention, "surface temperature of the printing medium provided with the ink" refers to a surface temperature of the printing medium at a position after being conveyed for 0.5 seconds, where the point in time when the ink is applied to the printing medium is assumed to be 0 seconds. For example, when the conveying rate of the printing medium is assumed to be "V" m/min, the surface temperature of a region X provided with an ink in the printing medium is measured at a position "(V×0.5)/60" m apart in the conveying direction from a position at which the ink is applied to the region X. In this regard, "position at which the ink is applied" in the case of the full-line type inkjet printing head refers to a position just below the printing head. In the examples described later, a non-contact infrared thermometer digital radiation temperature sensor (trade name "FT-H20", produced by KEYENCE CORPORATION) was used, and the surface temperature of the printing medium was measured at a position 10 cm apart in a substantially vertical direction from the surface of the printing medium.

In the heating step, heating is performed such that the surface temperature of the printing medium provided with the ink becomes preferably 80° C. or higher. From the viewpoint of preventing deformation of the printing medium due to heat, heating is performed such that the surface temperature becomes preferably 140° C. or lower. Examples of the method for heating the printing medium include a method in which a heater is disposed and the front surface (surface provided with the ink) of the printing medium is heated, a method in which the back surface is heated, and a method in which both surfaces are heated.

The printing medium may be heated continuously from before to after application of ink. Before the ink is applied, preferably, the printing medium is not heated or is heated so as to have a surface temperature of lower than 70° C. Further preferably, heating is performed to 60° C. or lower, and particularly preferably, heating is performed to 40° C. or lower.

When the printing medium is heated, the printing medium may be pressurized by using, for example, a pressure roller. The fixing property of the image can be improved by pressurizing the printing medium. When the printing medium is pressurized, it is not necessary that pressurization be performed during all processes of the heating step, and pressurization may be performed in some processes of the heating step. The printing medium may be pressurized in steps. A pressurizing step may be further included after the heating step.

Printing Medium

Figure 3:
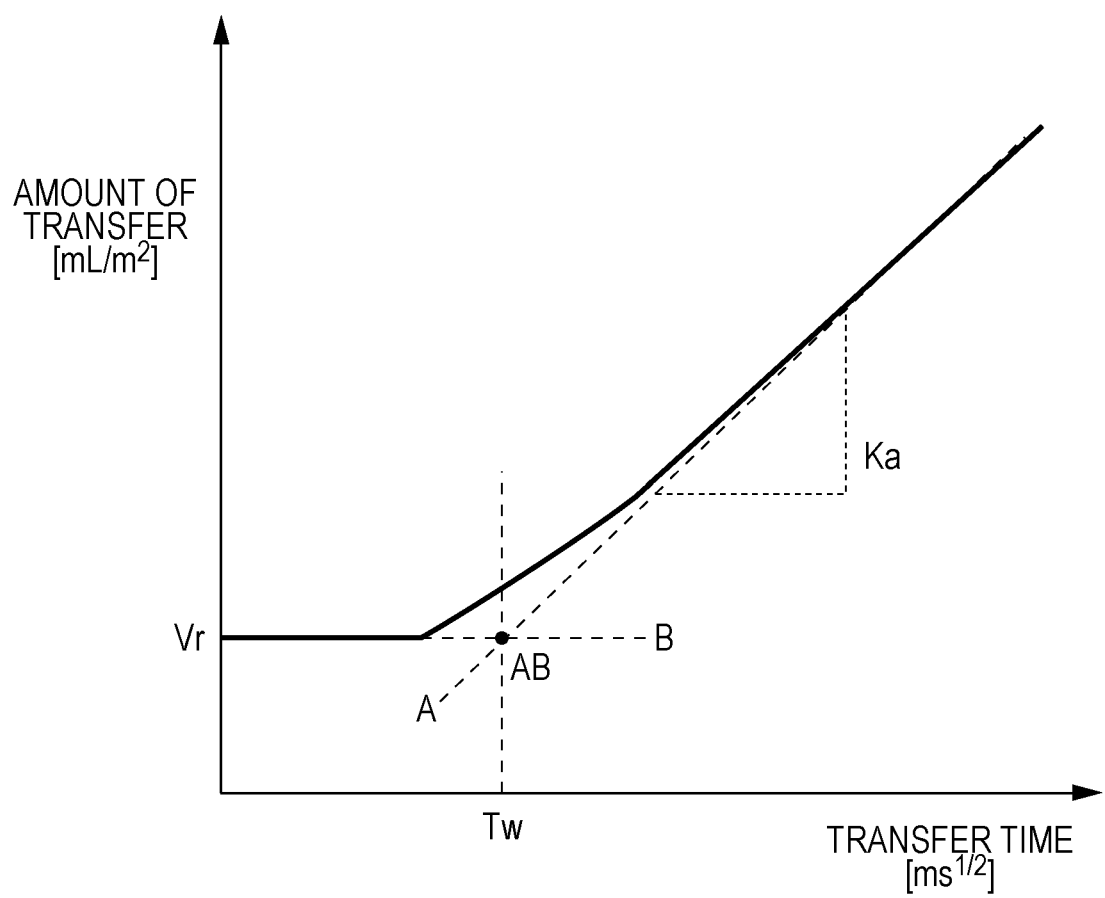
FIG. 3 is a diagram showing an example of an absorption curve illustrating a water absorption coefficient Ka of a printing medium.

The printing medium used in the image printing method according to the present invention is normal paper or a high-absorbency printing medium. The water absorption coefficient Ka of the printing medium is preferably 0.1 mL/(m$^2$·ms$^{1/2}$) or more. In this regard, 0.3 mL/(m$^2$·ms$^{1/2}$) or more and 3.0 mL/(m$^2$·ms$^{1/2}$) or less is further preferable, and 0.5 mL/(m$^2$·ms$^{1/2}$) or more and 3.0 mL/(m$^2$·ms$^{1/2}$) or less is particularly preferable. Regarding a method for deriving the water absorption coefficient Ka of the printing medium, a Bristow method described in JAPAN TAPPI Paper and Pulp Testing method No. 51 "Paper and Cardboard Liquid Absorbency Testing Method" is used. Detailed explanation of the Bristow method will not be provided because there are descriptions in many commercially available books. The absorption coefficient Ka (mL/(m$^2$·ms$^{1/2}$)) is determined on the basis of a wetting time Tw and a roughness exponent (Vr (mL/m$^2$)). FIG. 3 is a diagram showing an example of an absorption curve illustrating a water absorption coefficient Ka of the printing medium. The absorption curve shown in FIG. 3 is based on a permeation model in which a liquid comes into contact with a printing medium and permeation inside the printing medium starts after a lapse of a wetting time Tw. The inclination of the straight line after a lapse of the wetting time Tw indicates the absorption coefficient Ka. The absorption coefficient Ka corresponds to the liquid permeation rate inside the printing medium. As shown in FIG. 3, an intersection point AB of an approximate straight line A based on a least square method for calculating the absorption coefficient Ka and a straight line B indicating "V=Vr", where V represents an amount of liquid transferred and Vr represents a roughness exponent, and the wetting time Tw is calculated as the time required until the intersection point AB is reached. In this regard, the temperature of the liquid (water) that permeates the printing medium is set to be 25° C. That is, the water absorption coefficient Ka in the present invention is a water absorption coefficient Ka at 25° C.

The printing medium may be cut into a predetermined size in advance or be wound into the shape of a roll having an elongated array so as to be cut into a predetermined size after an image is printed. In particular, it is preferable that an elongated array of printing medium wound into the shape of a roll be used because a tension is readily applied.

Examples

Next, the present invention will be more specifically described with reference to the examples and the comparative examples. The present invention is not limited to the examples described below within the bounds of not departing from the gist of the present invention. In this regard, the amount of the component expressed in "part" or "%" is on a mass basis, unless otherwise specified.

Preparation of Pigment Dispersion Liquid (Resin-Dispersed Pigment)

Pigment Dispersion Liquid A

A 500-mL recovery flask provided with a mechanical agitator was put into a chamber of an ultrasonic generator. The recovery flask was charged with 1 g of resin dispersant (styrene-acrylic acid random copolymer, acid value of 80 mgKOH/g) and 120 mL of tetrahydrofuran, and the contents were agitated while ultrasonic waves were applied. In addition, 5 g of pigment (C.I. Pigment Blue 15:3) and 120 mL of tetrahydrofuran were put into another container. Mixing was performed until the surface of the pigment was sufficiently wetted with the solvent by using a planetary mixer (produced by KURABO INDUSTRIES LTD.). Thereafter, the contents were added to the above-described recovery flask and mixing was performed. A potassium hydroxide aqueous solution was added by dropping until the neutralization rate of the resin dispersant reached 100% so as to cause phase inversion. Subsequently, premixing was performed for 60 minutes. Then, dispersion was performed for 2 hours by using an atomizing apparatus (trade name "Nanomizer NM2-L200AR", produced by YOSHIDA KIKAI CO., LTD.) so as to produce a dispersion liquid. A rotary evaporator was used, and tetrahydrofuran was removed by distillation from the resulting dispersion liquid. The concentration was adjusted so as to produce pigment dispersion liquid A having a pigment content of 6.0%, the pigment content (%) being 5.0 times the resin dispersant content in a mass ratio.

Pigment Dispersion Liquid B

Pigment dispersion liquid B having a pigment content of 6.0%, the pigment content (%) being 5.0 times the resin dispersant content (%) in a mass ratio, was produced in the same manner as pigment dispersion liquid. A except that C.I. Pigment Yellow 74 was used as the pigment.

Preparation of Ink

Components in amounts (%) described in Tables 1-1 to 1-3 were mixed. In this regard, water was added such that the total became 100%. Agitation was performed sufficiently so as to facilitate dispersion and, thereafter, filtration was performed by using a glass filter (trade name "AP20", produced by MILLIPORE) so as to prepare inks. In Tables 1-1 to 1-3, "amount (%) of pigment" and "amount (%) of resin particles" refer to "amount (%) of solids in pigment" and "amount (%) of solids in resin particles", respectively, in the ink. In Tables 1-1 to 1-3, abbreviated names are as described below.

Pigment (self-dispersible pigment in which sulfonic acid groups or phosphonic acid groups bond to surfaces of pigment particles directly or with other atomic groups interposed therebetween)

"COJ250C": trade name "CAB-O-JET250C" (produced by Cabot Corporation)

"COJ450C": trade name "CAB-O-JET450C" (produced by Cabot Corporation)

"COJ270": trade name "CAB-O-JET270" (produced by Cabot Corporation)

"COJ470Y": trade name "CAB-O-JET470Y" (produced by Cabot Corporation)

"COJ465M": trade name "CAB-O-JET465M" (produced by Cabot Corporation.)

Resin Particles

"AC2714": acrylic resin particles (produced by Alberdingk)

"BT9": acrylic resin particles (produced by DSM)

"U9370": polyurethane resin particles (produced by Alherdingk)

"W5661": polyurethane resin particles (produced by Mitsui Chemicals, Inc.)

Water-Soluble Organic Solvent

"Gly": glycerin

"DEG": diethylene glycol

Surfactant

"AE40": trade name "Acetylenol E40" (produced by Kawaken Fine Chemicals Co., Ltd.)

"AE100": trade name "Acetylenol E100" (produced by Kawaken Fine Chemicals Co., Ltd.)

"D800": trade name "Dynol800" (produced by Air Products)

Pub Fastness Additive

"Lube190": polyethylene resin wax (produced by Michelman)

"Lube182": polyethylene resin wax (produced by Michelman)

"FS63": fluorine-based surfactant (produced by DuPont"

"FS64": fluorine-based surfactant (produced by DuPont"

"BYK333": silicon-based surfactant (produced by BYK Japan KK)

TABLE 1-1

Table 1-1: Ink composition

| | | Ink | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Pigment | COJ450C | 5 | 5 | 5 | 5 | 5 | 5 | 5 | 5 | 5 | 5 | 5 | | | 5 |
| | COJ250C | | | | | | | | | | | | 5 | 5 | |
| | Pigment dispersion liquid A | | | | | | | | | | | | | | |
| | COJ470Y | | | | | | | | | | | | | | |
| | COJ270 | | | | | | | | | | | | | | |
| | Pigment dispersion liquid B | | | | | | | | | | | | | | |
| | COJ465M | | | | | | | | | | | | | | |
| Resin particles | BT9 | 5 | 5 | 5 | 5 | 5 | 5 | 5 | 5 | | | | 5 | | 5 |
| | AC2714 | | | | | | | | | 5 | | | | | |
| | W5661 | | | | | | | | | | 5 | | | 5 | |
| | U9370 | | | | | | | | | | | 5 | | | |
| Surfactant | AE40 | | | | | | | | | | | | | | 1 |
| | D800 | 1 | 1 | 1 | 1 | 1 | 1 | 1 | 1 | 1 | 1 | 1 | 1 | 1 | |
| | AE100 | | | | | | | | | | | | | | |
| Rub fastness additive | Lube190 | 2 | 1 | 4 | 0.5 | | | | | 2 | 2 | 2 | 2 | 2 | 2 |
| | Lube182 | | | | | 2 | | | | | | | | | |
| | FS63 | | | | | | 0.2 | | | | | | | | |
| | FS64 | | | | | | | 0.2 | | | | | | | |
| | BYK333 | | | | | | | | 0.2 | | | | | | |
| Water-soluble organic solvent | Gly | 15 | 15 | 15 | 15 | 15 | 15 | 15 | 15 | 15 | 15 | 15 | 15 | 15 | 15 |
| | DEG | | | | | | | | | | | | | | |
| | Water | rest | rest | rest | rest | rest | rest | rest | rest | rest | rest | rest | rest | rest | rest |

TABLE 1-2

Ink composition

| | | Ink | | | | | | | | | | | | | |
|---|---|---|---|---|---|---|---|---|---|---|---|---|---|---|---|
| | | 15 | 16 | 17 | 18 | 19 | 20 | 21 | 22 | 23. | 24 | 25 | 26 | 27 | 28 |
| Pigment | COJ450C | 5 | | | 5 | 5 | | | | | | | | | |
| | COJ250C | | | | | | | | | | | | | | |
| | Pigment dispersion liquid A | | 5 | 5 | | | | | | | | | | | |
| | COJ470Y | | | | | | 5 | 5 | 5 | 5 | 5 | 5 | 5 | 5 | 5 |
| | COJ270 | | | | | | | | | | | | | | |
| | Pigment dispersion liquid B | | | | | | | | | | | | | | |
| | COJ465M | | | | | | | | | | | | | | |
| Resin particles | BT9 | 5 | 5 | | 5 | 5 | 5 | 5 | 5 | 5 | 5 | 5 | 5 | 5 | 5 |
| | AC2714 | | | | | | | | | | | | | | |
| | W5661 | | | 5 | | | | | | | | | | | |
| | U9370 | | | | | | | | | | | | | | |
| Surfactant | AE40 | | | | | | | | | | | | | | |
| | D800 | | 1 | 1 | 1 | 1 | 1 | 1 | 1 | 1 | 1 | 1 | 1 | 1 | 1 |
| | AE100 | 1 | | | | | | | | | | | | | |
| Rub fastness additive | Lube190 | 2 | 2 | 2 | | 2 | 1.7 | 1.5 | 0.5 | 3.5 | | | | | |
| | Lube182 | | | | | | | | | | 1.5 | | | | |
| | FS63 | | | | | | | | | | | 0.1 | | | |
| | FS64 | | | | | | | | | | | | 0.1 | | |
| | BYK333 | | | | | | | | | | | | | 0.1 | |
| Water-soluble organic solvent | Gly | 15 | 15 | 15 | 15 | | 15 | 15 | 15 | 15 | 15 | 15 | 15 | 15 | 15 |
| | DEG | | | | | 15 | | | | | | | | | |
| | Water | rest | rest | rest | rest | rest | rest | rest | rest | rest | rest | rest | rest | rest | rest |

TABLE 1-3

| | | Ink composition |||||||||||||||
|---|---|---|---|---|---|---|---|---|---|---|---|---|---|---|
| | | Ink |||||||||||||||
| | | 29 | 30 | 31 | 32 | 33 | 34 | 35 | 36 | 37 | 38 | 39 | 40 | 41 | 42 |
| Pigment | COJ450C | | | | | | | | | | | | | | |
| | COJ250C | | | | | | | | | | | | | | |
| | Pigment dispersion liquid A | | | | | | | | | | | | | | |
| | COJ470Y | 5 | 5 | 5 | | | 5 | 5 | | | 5 | 5 | 5 | 5 | |
| | COJ270 | | | | 5 | 5 | | | | | | | | | |
| | Pigment dispersion liquid B | | | | | | | | 5 | 5 | | | | | |
| | COJ465M | | | | | | | | | | | | | | 5 |
| Resin particles | BT9 | | | | 5 | | 5 | 5 | 5 | | 5 | 5 | 5 | 5 | 5 |
| | AC2714 | 5 | | | | 5 | | | | | | | | | |
| | W5661 | | 5 | | | | | | | 5 | | | | | |
| | U9370 | | | 5 | | | | | | | | | | | |
| Surfactant | AE40 | | | | | | | | | | | | | | |
| | D800 | 1 | 1 | 1 | 1 | 1 | | | 1 | 1 | 1 | 1 | 1 | 1 | 1 |
| | AE100 | | | | | | | 1 | | | | | | | |
| Rub fastness additive | Lube190 | 1.5 | 1.5 | 1.5 | 1.5 | 1.5 | 1.5 | 1.5 | 1.5 | 1.5 | 1.5 | 2 | 1 | 1.5 | 1.5 |
| | Lube182 | | | | | | | | | | | | | | |
| | FS63 | | | | | | | | | | | | | | |
| | FS64 | | | | | | | | | | | | | | |
| | BYK333 | | | | | | | | | | | | | | |
| Water-soluble organic solvent | Gly | 15 | 15 | 15 | 15 | 15 | 15 | 15 | 15 | 15 | 15 | 15 | 15 | | 15 |
| | DEG | | | | | | | | | | | | | 15 | |
| | Water | rest | rest | rest | rest | rest | rest | rest | rest | rest | rest | rest | rest | rest | rest |

Evaluation

Table 2 shows the number of inks used (number of printing heads), and correspondence relationships between the combination of inks (ink set) and the line head and between the type of ink and the line head. An image was printed on a printing medium by using an inkjet printing apparatus that was incorporated with an piezoelectric type inkjet head (trade name "KJ4", produced by KYOCERA Corporation, nozzle density of 600 dpi) and that had a configuration shown in FIG. 1. Regarding the printing conditions, the temperature was set to be 25° C., the relative humidity was set to be 55%, the ink ejection frequency was set to be 39 kHz, the conveying rate of the printing medium was set to be 100 m/s, and the ink ejection volume/dot during printing was set to be about 13 pL. Regarding the above-described inkjet printing apparatus, the condition in which 1 dot of ink droplet having 13 ng was applied to a unit region of 1/600 inch×1/600 inch at a resolution of 600 dpi×600 dpi was assumed to be a printing duty of 100%.

Color Developability of Image Printed by Monochrome Ink

The above-described inkjet printing apparatus was used, and a solid image (printing duty of 100%) having a size of 3 cm×3 cm was printed on a printing medium (trade name "DL9084", produced by Mitsubishi Paper Mills Limited, basis weight of 91 g/m$^2$). The optical density of the printed image was measured by using a reflection densitometer (trade name "RD19I" produced by GretagMacbeth), and the color developability of the image was evaluated on the basis of the evaluation criteria described below. The evaluation results are shown in Table 2. In the following evaluation criteria, "A" or "B" was assumed to be a preferable level, and "C" was assumed to be an intolerable level.

A: The optical density was 1.3 or more.
B: The optical density was 1.2 or more and less than 1.3.
C: The optical density was less than 1.2.

Color Developability of Image Printed by a Plurality of Inks

The above-described inkjet printing apparatus was used, and a solid image (printing duty of 100%) having a size of 3 cm×3 cm was printed on a printing medium (trade name "DL9084", produced by Mitsubishi Paper Mills Limited, basis weight of 91 g/m$^2$). An image was printed by applying the inks of the respective colors to the same place on the printing medium. The optical density of the printed image was measured by using a reflection densitometer (trade name "RD19I" produced by GretagMacbeth), and the color developability of the image was evaluated on the basis of the evaluation criteria described below. The evaluation results are shown in Table 2. In the following evaluation criteria, "A", "B", or "C" was assumed to be a preferable level, and "D" was assumed to be an intolerable level.

A: A difference between the optical density of the image printed by a monochrome ink and the optical density of the image printed by inks of a plurality of colors was less than 0.05.

B: A difference between the optical density of the image printed by a monochrome ink and the optical density of the image printed by inks of a plurality of colors was 0.05 or more and less than 0.07.

C: A difference between the optical density of the image printed by a monochrome ink and the optical density of the image printed by inks of a plurality of colors was 0.07 or more and less than 0.10.

D: A difference between the optical density of the image printed by a monochrome ink and the optical density of the image printed by inks of a plurality of colors was 0.10 or more.

Rub Fastness of Image

The above-described inkjet printing apparatus was used, and an image in which three lines having a width of 3 mm and a line having a width of 17 mm (printing duty of each ink color was 100% with respect to each line) were arranged parallel to each other was printed on the printing medium. Regarding the printing medium, trade name "DL9084" (produced by Mitsubishi Paper Mills Limited, basis weight of 91 g/m²) was used. Paper (trade name "OK Top Coat+", produced by Oji Paper Co., Ltd., basis weight of 105 g/m²) was stacked on the image within 3 minutes after printing, and a weight of 500 g was further placed thereon such that the ground contact area was set to be 12.6 cm². Subsequently, a rub fastness test was performed, where rubbing was performed once such that the speed of the printing medium printed with the image relative to the paper was set to be 10 cm/s and the ground contact surface of the weight crossed over the four lines at a right angle. Thereafter, an ink attached to the region of 12.6 cm², on which the weight was placed, of the paper was read by a scanner (trade name "Multifunctional device iR3245F", produced by CANON KABUSHIKI KAISHA, 600 dpi, gray scale, photo mode). The proportion of the area of a portion having brightness of less than 128 of 256 gradation levels (proportion of ink adhesion area) was calculated, and the rub fastness of the image was evaluated on the basis of the evaluation criteria described below. The evaluation results are shown in Table 2. In the following evaluation criteria, "A" or "B" was assumed to be a preferable level, and "C" was assumed to be an intolerable level.

A: The proportion of ink adhesion area was 1% or less.
B: The proportion of ink adhesion area was more than 1% and 5% or less.
C: The proportion of ink adhesion area was more than 5%.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image printing method comprising the step of:
applying at least two inks that contain a color pigment, resin particles, and water onto a printing medium by ejecting the inks using an inkjet printing apparatus,
wherein the inkjet printing apparatus includes at least two printing line heads sequentially arranged in a printing medium conveying direction, each of the printing line heads comprising a row of ejection units,
the printing medium is plain paper or a high-absorbency printing medium,
the printing medium having a water absorption coefficient Ka of 0.1 mL/(m²·ms$^{1/2}$) or more,
a rub fastness additive is contained in a first ink ejected from at least a first printing line head that is located at an uppermost-stream position in the printing medium conveying direction of the at least two printing line heads,
the content of the rub fastness additive in a second ink ejected from a printing line head that is located at a position downstream of the first printing line head in the printing medium conveying direction is less than the content of the rub fastness additive in the first ink, and
in the printing medium to which the first ink and the second ink are applied, the color pigment in the first ink and the color pigment in the second ink are fixed in this order from a side of a surface to which the first ink and the second ink are applied.

TABLE 2

Table 2: Evaluation result

|  |  | Number of inks used | Type of ink | | | Evaluation | | | | | | |
|---|---|---|---|---|---|---|---|---|---|---|---|---|
|  |  |  | Line head | | | Rub fastness | | | Color Developability | | | |
|  |  |  | 20a | 20b | 20c | CY | CM | MY | monochrome | CY | CM | MY |
| Example | 1 | 2 | 1 | 21 | — | A | — | — | A | B | — | — |
|  | 2 | 2 | 2 | 22 | — | A | — | — | A | B | — | — |
|  | 3 | 2 | 3 | 23 | — | A | — | — | A | B | — | — |
|  | 4 | 2 | 4 | 24 | — | A | — | — | A | B | — | — |
|  | 5 | 2 | 5 | 25 | — | A | — | — | A | B | — | — |
|  | 6 | 2 | 6 | 26 | — | A | — | — | A | B | — | — |
|  | 7 | 2 | 7 | 27 | — | A | — | — | A | B | — | — |
|  | 8 | 2 | 8 | 28 | — | A | — | — | A | B | — | — |
|  | 9 | 2 | 9 | 29 | — | A | — | — | A | B | — | — |
|  | 10 | 2 | 10 | 30 | — | A | — | — | A | B | — | — |
|  | 11 | 2 | 11 | 31 | — | A | — | — | A | B | — | — |
|  | 12 | 2 | 12 | 32 | — | A | — | — | B | B | — | — |
|  | 13 | 2 | 13 | 33 | — | A | — | — | B | B | — | — |
|  | 14 | 2 | 14 | 34 | — | A | — | — | A | B | — | — |
|  | 15 | 2 | 15 | 35 | — | A | — | — | A | B | — | — |
|  | 16 | 2 | 16 | 36 | — | A | — | — | A | B | — | — |
|  | 17 | 2 | 17 | 37 | — | A | — | — | A | B | — | — |
|  | 18 | 2 | 1 | 22 | — | A | — | — | A | B | — | — |
|  | 19 | 2 | 1 | 24 | — | A | — | — | A | B | — | — |
|  | 20 | 2 | 19 | 41 | — | A | — | — | A | B | — | — |
|  | 21 | 2 | 1 | 20 | — | A | — | — | A | C | — | — |
|  | 22 | 3 | 1 | 42 | 40 | A | A | A | B | B | B | B |
|  | 23 | 3 | 1 | 42 | 22 | A | A | A | B | B | B | B |
| Comparative example | 1 | 2 | 1 | 39 | — | A | — | — | B | D | — | — |
|  | 2 | 2 | 1 | 23 | — | A | — | — | B | D | — | — |
|  | 3 | 2 | 18 | 24 | — | C | — | — | A | A | — | — |

According to the present invention, an image printing method capable of printing an image having excellent color developability and excellent rub fastness even when color inks of a plurality of colors are used can be provided.

2. The image printing method according to claim 1, wherein the rub fastness additive is at least one selected from a group consisting of a carnauba wax, a candelilla wax, a beeswax, a rice wax, lanoline, a paraffin wax, a microcrystalline wax, a polyethylene wax, a polyethylene oxide wax, petrolatum, a montan wax, a carbon wax, Hoechst wax, a polyolefin wax, and a stearic acid amide.

3. The image printing method according to claim 1, wherein the rub fastness additive is at least one surfactant of fluorine-based surfactants and silicon-based surfactants.

4. The image printing method according to claim 1, wherein the content of the rub fastness additive in an ink ejected from a printing line head that is located at a downstream-side position in the printing medium conveying direction is at least 0.5% by mass less than the content of the rub fastness additive in an ink ejected from an upstream-side adjoining printing line head in the printing medium conveying direction.

5. The image printing method according to claim 1, wherein the color pigment is a self-dispersible pigment.

6. The image printing method according to claim 5, wherein the self-dispersible pigment is a phosphonic-acid-based self-dispersible pigment in which phosphonic acid groups bond to pigment particle surfaces directly or with other atomic groups interposed therebetween.

7. The image printing method according to claim 1, wherein the color pigment is a resin-dispersed pigment dispersed by a resin dispersant.

8. The image printing method according to claim 7, wherein the content (% by mass) of the color pigment is 3.3 times or more the content (% by mass) of the resin dispersant on a mass ratio basis.

9. The image printing method according to claim 1, wherein the resin particles are acrylic resin particles or polyurethane resin particles, or acrylic resin particles and polyurethane resin particles.

10. The image printing method according to claim 1, wherein each of the printing line heads has a length that is longer than a width of the printing medium.

11. The image printing method according to claim 1, wherein the ink ejected from the printing line head that is located at the position downstream of the first printing line head comprises the rub fastness additive.

12. The image printing method according to claim 1, wherein the ink ejected from the printing line head that is located at the position downstream of the first printing line head comprises 0.1% to 3.5% by weight of the rub fastness additive based on a total weight of the ink.

13. The image printing method according to claim 1, wherein the color pigment of the first ink ejected from at least the first printing line head is selected from the group consisting of a cyan pigment, a magenta pigment, and a yellow pigment.

* * * * *